(12) United States Patent
Hoff, Jr. et al.

(10) Patent No.: US 12,265,402 B2
(45) Date of Patent: Apr. 1, 2025

(54) METHOD FOR CONTROLLING THE VELOCITY OF A PIPELINE PIG

(71) Applicant: Air Liquide Large Industries U.S. LP, Houston, TX (US)

(72) Inventors: Robert D. Hoff, Jr., Pasadena, TX (US); Matthew J. Malone, Willis, TX (US); Michael C. Gryder, Willis, TX (US)

(73) Assignee: Air Liquide Large Industries U.S. LP, Houston, TX (US)

(*) Notice: Subject to any disclaimer, the term of this patent is extended or adjusted under 35 U.S.C. 154(b) by 408 days.

(21) Appl. No.: 17/734,712

(22) Filed: May 2, 2022

(65) Prior Publication Data
US 2023/0350437 A1    Nov. 2, 2023

(51) Int. Cl.
*G05D 13/62*    (2006.01)
*F16L 55/38*    (2006.01)

(52) U.S. Cl.
CPC .............. *G05D 13/62* (2013.01); *F16L 55/38* (2013.01)

(58) Field of Classification Search
CPC ....................................................... F16L 55/38
USPC ..................................................... 15/104.061
See application file for complete search history.

(56) References Cited

U.S. PATENT DOCUMENTS

| | | | | |
|---|---|---|---|---|
| 3,266,076 A * | 8/1966 | Surber | ............... | F16L 55/46 15/104.062 |
| 3,665,954 A * | 5/1972 | McNeal | ............... | F16L 55/46 15/104.061 |
| 6,527,869 B1 * | 3/2003 | Bourg | ............... | B08B 9/0553 15/104.062 |
| 7,406,738 B2 * | 8/2008 | Kinnari | ............... | F16L 55/38 15/104.067 |
| 7,500,834 B2 * | 3/2009 | Durward | ............... | F16L 55/26 137/15.04 |
| 10,317,014 B2 * | 6/2019 | Barden | ............... | G01M 3/022 |
| 10,801,658 B2 * | 10/2020 | Poe | ............... | F16L 41/004 |
| 2004/0247451 A1 * | 12/2004 | Durward | ............... | F16L 55/26 417/572 |
| 2018/0045598 A1 * | 2/2018 | Barden | ............... | G01M 3/2823 |

(Continued)

FOREIGN PATENT DOCUMENTS

| | | | | |
|---|---|---|---|---|
| FR | 3088102 A1 | * | 5/2020 | ............. F16L 55/18 |
| GB | 2325293 A | * | 11/1998 | ............ B08B 9/0551 |
| KR | 100661150 B1 | * | 12/2006 | |

(Continued)

*Primary Examiner* — Marc Carlson
(74) *Attorney, Agent, or Firm* — Elwood L. Haynes

(57) ABSTRACT

A method for controlling the velocity of a pipeline pig, the method including, introducing a pressurized gas into a section of pipeline to be treated and maintaining the velocity of a smart pipeline pig at a predetermined velocity by regulating the pressurized gas to a predetermined volume. A method for controlling the velocity of a pipeline pig, the method including fluidically connecting a first skid to a first end of a section of pipeline to be treated, fluidically connecting a second skid to a second end of the section of pipeline to be treated, introducing a pressurized gas into the section of pipeline to be treated via the first skid, launching a smart pipeline pig into the section of pipeline to be treated, and maintaining the velocity of the smart pipeline pig at a predetermined velocity by regulating the pressurized gas to a predetermined volume.

17 Claims, 7 Drawing Sheets

(56) References Cited

U.S. PATENT DOCUMENTS

2019/0078722 A1\* 3/2019 Theener .................. B08B 9/053
2022/0003629 A1\* 1/2022 Jagannathan ............. F17D 5/06

FOREIGN PATENT DOCUMENTS

| RU | 2644429 C2 \* | 2/2018 | | |
|---|---|---|---|---|
| WO | WO-9710943 A1 \* | 3/1997 | ............. | B29C 63/34 |
| WO | WO-2021069530 A1 \* | 4/2021 | ............. | F16L 55/38 |

\* cited by examiner

METHOD FOR CONTROLLING THE VELOCITY OF A PIPELINE PIG

BACKGROUND

Pipelines are generally cleaned and inspected using inline tools called "pigs". Each tool has a specific purpose and operating velocity range. For instance, a chemical cleaning pig train containing a trapped volume of chemical may need to travel as slow as 1 foot per second (0.68 mph) or a magnetic flux leakage (MFL) tool may need to travel at 2-3 miles per hour. Each pig and purpose dictate the appropriate velocity. The proposed invention addresses the industry need to accurately control the speed of inline tools using pipeline nitrogen or other compressed gas sources.

SUMMARY

A method for controlling the velocity of a pipeline pig, the method including, maintaining the velocity of a smart pipeline pig at a predetermined velocity by regulating a pressurized gas to a predetermined volume.

A method for controlling the velocity of a pipeline pig, the method including, introducing a pressurized gas into a section of pipeline to be treated and maintaining the velocity of a smart pipeline pig at a predetermined velocity by regulating the pressurized gas to a predetermined volume.

A method for controlling the velocity of a pipeline pig, the method including fluidically connecting a first skid to a first end of a section of pipeline to be treated, fluidically connecting a second skid to a second end of the section of pipeline to be treated, introducing a pressurized gas into the section of pipeline to be treated via the first skid, launching a smart pipeline pig into the section of pipeline to be treated, and maintaining the velocity of the smart pipeline pig at a predetermined velocity by regulating the pressurized gas to a predetermined volume.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
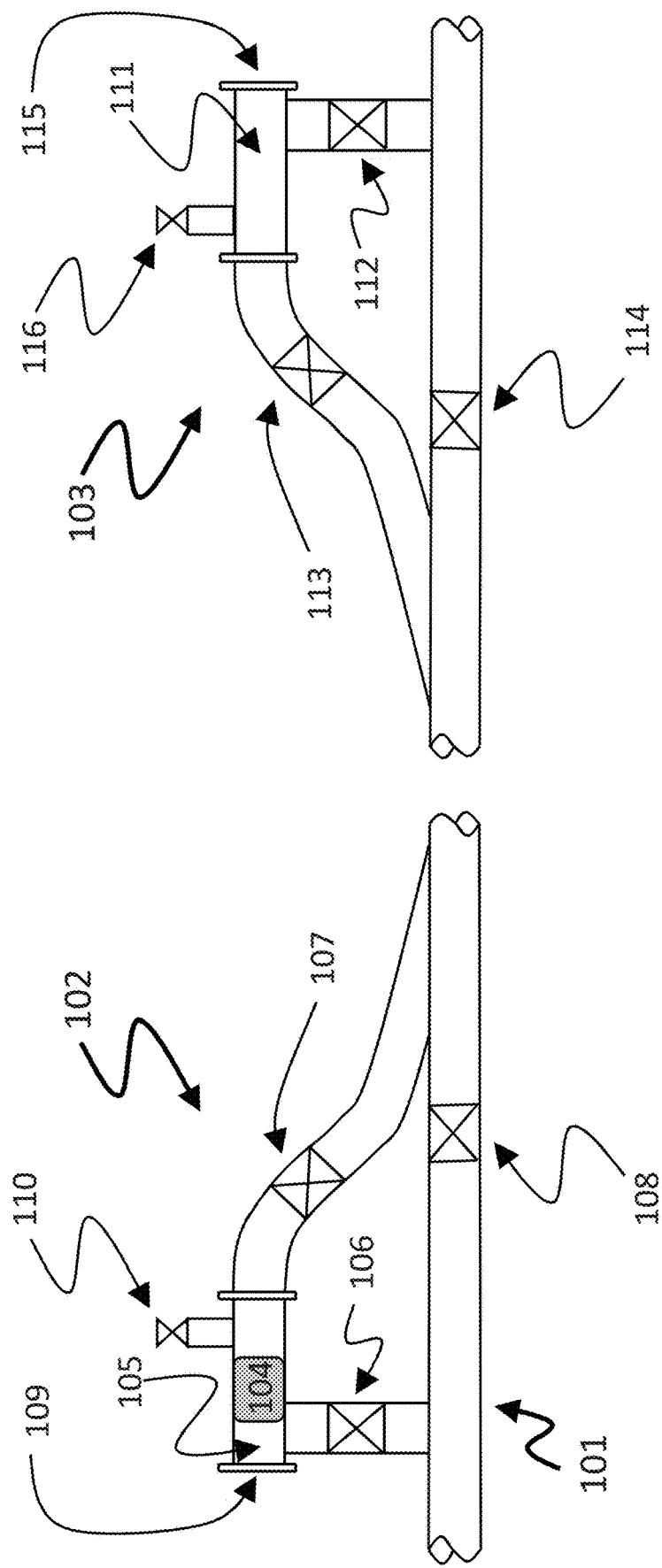
FIG. 1 is a schematic representation of a typical pipeline pig launcher and catcher, in accordance with one embodiment of the present invention.

101=main pipeline
102=pipeline pig launcher
103=pipeline pig receiver
104=pipeline pig
105=first trap barrel
106=kicker valve
107=first trap isolation valve
108=first main line isolation valve
109=first trap door
110=first vent valve
111=second trap barrel
112=bypass valve
113=second trap isolation valve
114=second main line isolation valve
115=second trap door
116=second vent valve
201=secondary main line isolation valve
202=pipeline section to be pigged (cleaned or inspected)
301=first skid
302=second skid
303=first flow control valve
304=first pressure transmitter
305=first temperature element
306=first differential pressure sensor
307=pressurized gas source
308=first flow computer
309=first data transmitter
310=second flow control valve
311=second pressure transmitter
312=second temperature element
313=second differential pressure sensor
314=second flow computer
315=second data transmitter
401=first temporary connection (between first skid and main pipeline)
402=second temporary connection (between second skid and main pipeline)
501=pressurized gas vent

DETAILED DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used in the figures and as described below, a dosed valve is designated with black fill and an open valve is designated with white fill. As used herein, the term "smart pipeline pig" is defined as an inspection device that records information about the internal and external conditions of a pipeline. The smart pipeline pig inspects the internal and external condition of the pipe by moving through the pipeline. Smart pipeline pigs monitor many different things during pipeline inspection, such as restrictions, malformations, and corrosion of the pipeline. Smart pipeline pigs may remove deposits and debris. A smart pipeline pig may use electromagnetic acoustic transducers, magnetic flux leakage, ultrasound, and other systems known in the art for the inspection. A pipeline pig may also carry with it chemicals to chemically affect the interior of the pipeline.

During the pigging run the smart pipeline pig is typically unable to directly communicate with the outside world due to the distance underground or underwater and/or the materials that the pipe is made of. For example, steel pipelines effectively prevent any significant radio communications outside the pipe. It is therefore often necessary that the smart pipeline pig use internal means to record its own movement during the trip.

Location verification may be accomplished by surface instruments that record the smart pipeline pig's passage by either audible, magnetic, radio-transmission or other means known to the art. The sensors record when they detect the passage of the pig (time-of-arrival); this is then compared to the internal record for verification or adjustment.

As used herein, the term "predetermined pressure" is defined as a pressure which is at least 100 psi below the maximum allowable working pressure that this section of pipe has been rated for. As used herein, the term "excursion pressure" is defined as a pressure that is approximately 50 psi greater than the associated "predetermined pressure". In a non-limiting example, if the length of pipeline section to be treated 202 has an ANSI pressure rating of 300 #, and this section is at ambient temperature (i.e. below 100F), the maximum allowable working pressure would be 740 psig. Thus, in this non-limiting example, the "predetermined pressure" would need to be below 640 psig, and the "excursion pressure" would need to be below 690 psig. As used herein, the term "predetermined velocity" is defined as being 8 meters per second (18 miles per hour, 26 feet per second) or less. Preferably less than 5 meters per second (11 miles per hour, 16 feet per second) or less. More preferably less than 2 meters per second (4.5 miles per hour, 6 feet per second).

Figure 2:
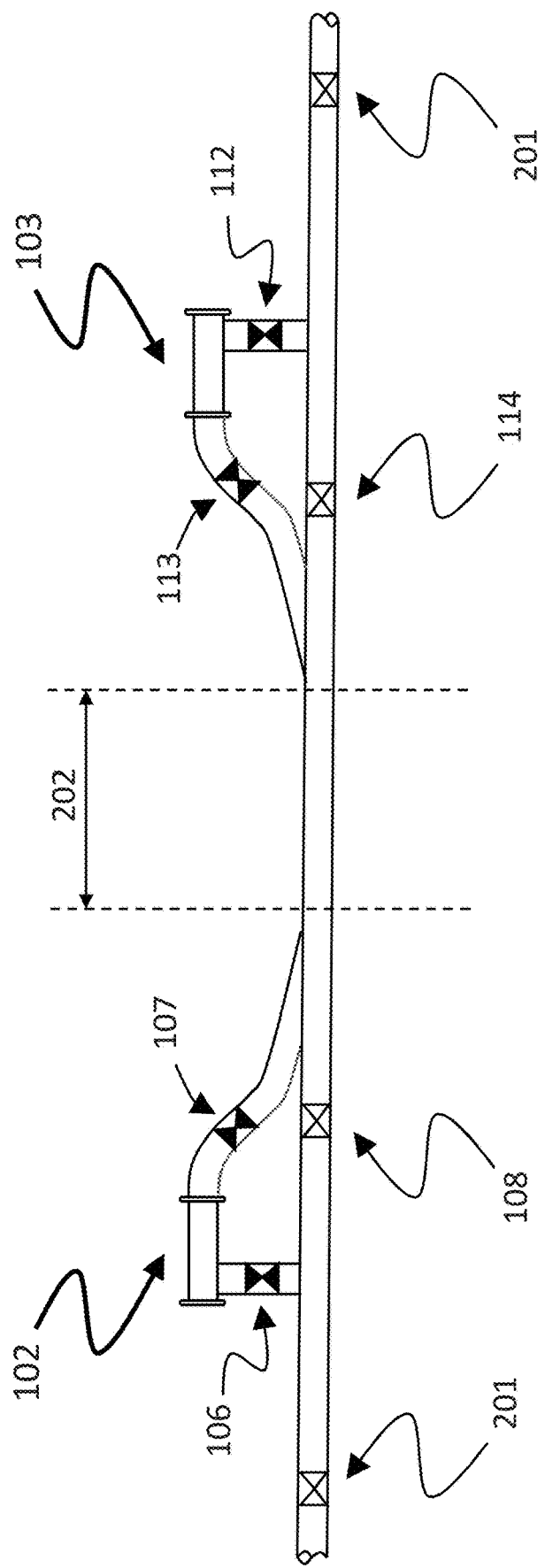
FIG. 2 is a schematic representation of a typical pipeline pig launcher and catcher also indicating the section of pipeline to be pigged, in accordance with one embodiment of the present invention.

Turning to FIG. 1 and FIG. 2, a typical pipeline pig launcher 102 and catcher 103 are presented. A typical operating sequence to launch a pipeline pig would be to close kicker valve 106 and first trap isolation valve 107, and open first vent valve 110. Open first trap door 109, insert pipeline pig 104, then close first trap door 109. Gradually open kicker valve 106 as any gas present is vented through first vent valve 110. Once fully vented, close first vent valve 110. This will allow the pressure across first main line isolation valve 108 to be equalized. Then, first main line isolation valve 108 is opened. As first main line isolation valve 108 is then gradually closed, flow through kicker valve 106 will increase and begin moving pipeline pig 104. Once pig 104 has left first trap barrel 105, first main line isolation valve 108 is opened, and kicker valve 106 and first trap isolation valve 107 are closed.

A typical operating sequence to catch a pipeline pig would be to ensure that second trap barrel 111 of catcher 103 is fully pressurized. Then bypass valve 112, and second trap isolation valve 113 are opened, while second main line isolation valve 114 is partially closed. As pipeline pig 104 approaches, second trap isolation valve 113 and bypass valve 112 are closed. Thus, capturing pipeline pig 104. Second vent valve 116 is opened. After second trap barrel 111 is fully depressurized, second trap door 115 is opened and pipeline pig 104 is removed.

This is intended to be only a representation of a typical operating scenario. One of ordinary skill in the art will recognize that there are many different launcher and receiver designs, and differing procedures may be implemented. The skilled artisan will recognize that the following novel procedure may be utilized equally well with any systems known to the art.

Figure 3B:
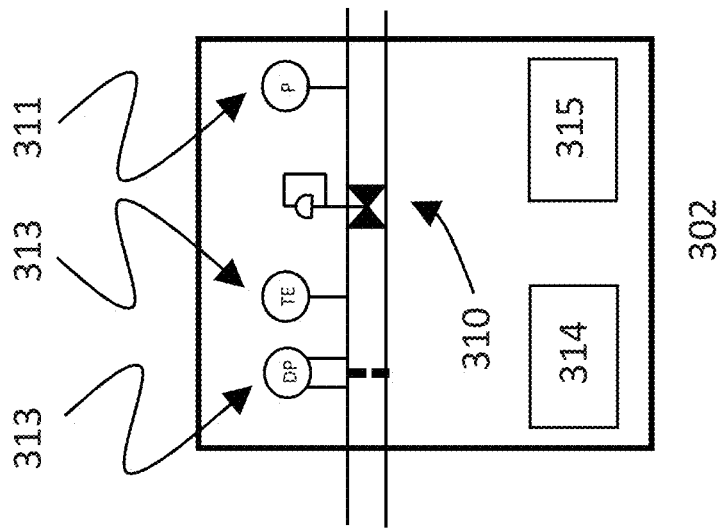
FIG. 3b is a schematic representation of the receiving skid, in accordance with one embodiment of the present invention.
Figure 3A:
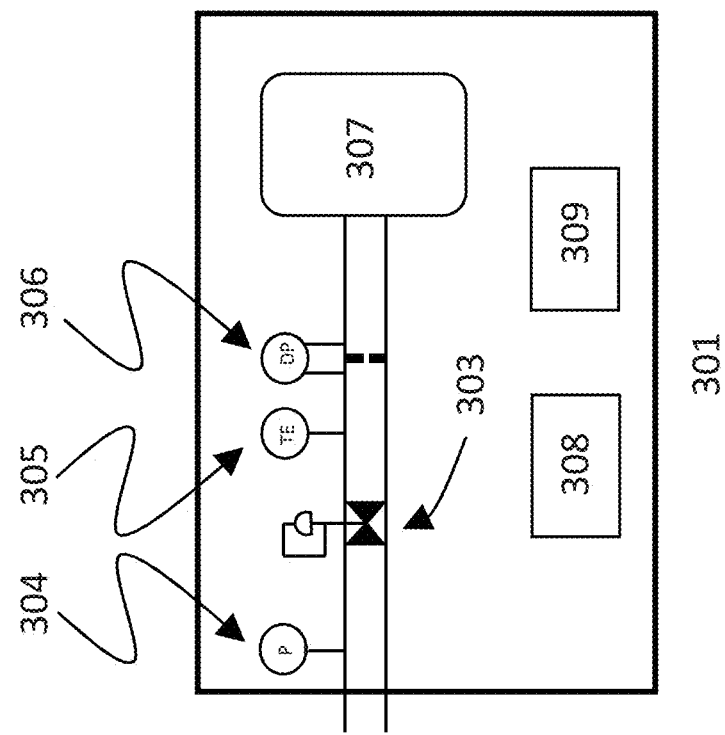
FIG. 3a is a schematic representation of the launching skid, in accordance with one embodiment of the present invention.

Turning to FIG. 3a and FIG. 3b, the first skid 301 (launching skid) and the second skid 302 (receiving skid) are illustrated. First skid 301 includes first flow control valve 303, first pressure transmitter 304, first temperature element 305, first differential pressure sensor 306, pressurized gas source 307, first flow computer 308, and first data transmitter 309. Second skid 302 includes second flow control valve 310, second pressure transmitter 311, second temperature element 312, second differential pressure sensor 313, second flow computer 314, and second data transmitter 315.

First skid 301 and/or second skid 302 may be portable. In one embodiment, first skid 301 and/or second skid 302 are sized to be able to be carried in a typical pickup truck bed and moved with a typical forklift.

Turning to FIGS. 4 through 7, an example of one embodiment of the present invention is discussed in which a pressurized system may be used for smart pipeline pigs. A section to be treated 202 of main pipeline 101 is selected. Appropriate block valves, such as secondary main line isolation valves 201 are closed to temporarily isolate section 202.

Figure 4:
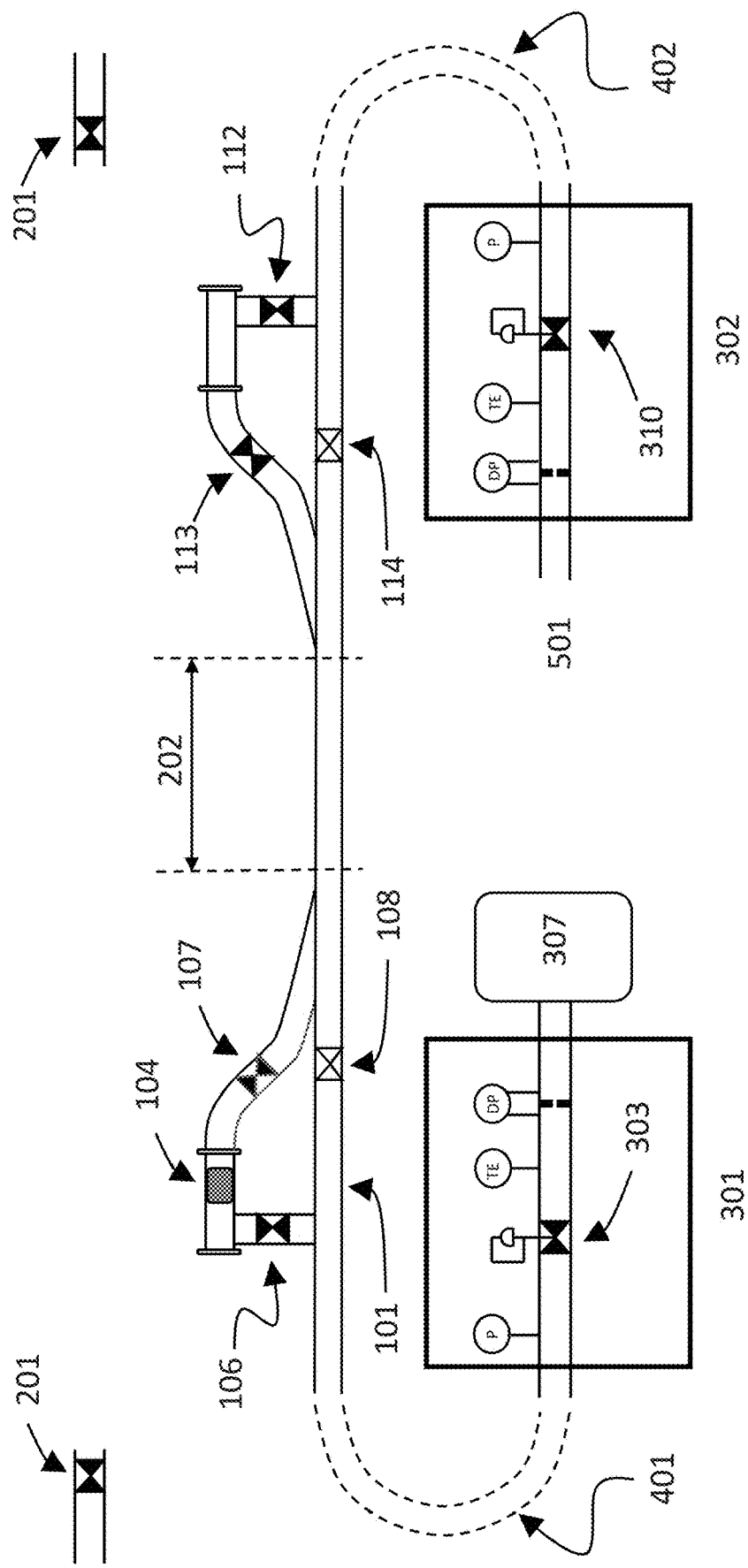
FIG. 4 is a schematic representation of the skid attachment to the pig launcher and catcher and the pipeline section to be pigged, in accordance with one embodiment of the present invention.

First skid 301 is then placed at the inlet side of pipeline section 202 and connected to pressurized gas source 307. In one embodiment, pressurized gas source 307 may be a nitrogen pipeline (not shown). Pressurized gas source 307 may be compressed nitrogen or compressed air. First skid 301 is then connected to pipeline section 202 via first temporary connection 401. As shown in FIG. 4, at this time, first skid flow control valve 303, kicker valve 105, and first trap isolation valve 107 are closed, and first main line isolation valve 108, and second main isolation valve 114 are open.

Figure 5:
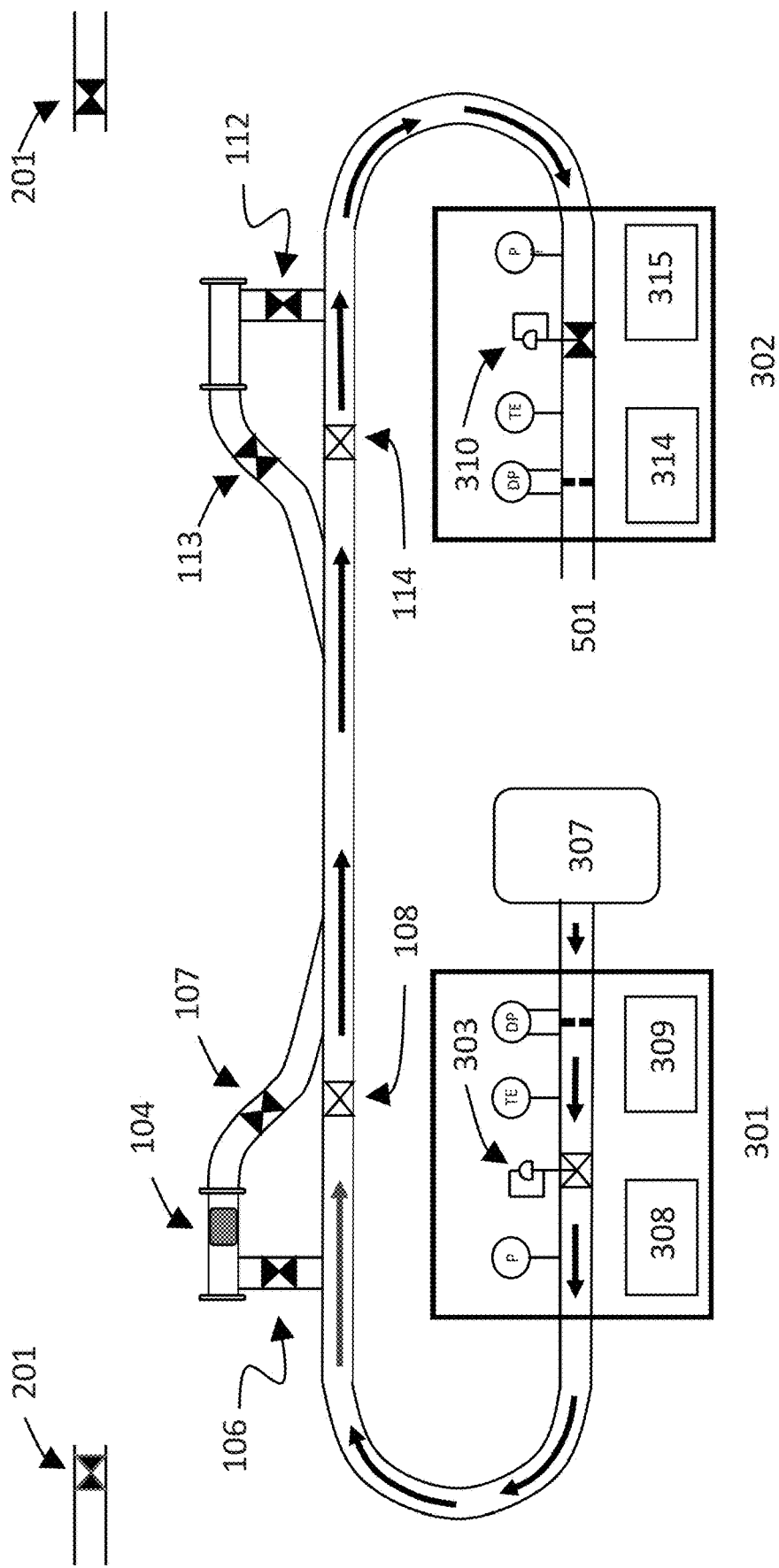
FIG. 5 is a schematic representation of the nitrogen pressurization step, in accordance with one embodiment of the present invention.

Second skid 302 is then placed at the outlet side of pipeline section 202 and connected to pressurized gas vent 501. Second skid 302 is then connected to pipeline section 202 via second temporary connection 402. At this time, second skid flow control valve 310, bypass valve 112, and second trap isolation valve 113 are closed. Once all these connections have been made, pipeline section 202 is pressurized using first skid flow computer 308. As shown in FIG. 5, at this time, kicker valve 105, first trap isolation valve 107, second trap isolation valve 113, bypass valve 112, and second control valve 310 are closed, and first skid flow control valve 303, first main line isolation valve 108, and second main isolation valve 114 are open. Second skid flow computer 314 is set to maintain a predetermined pressure and will vent excess nitrogen to maintain this pressure.

Figure 6:
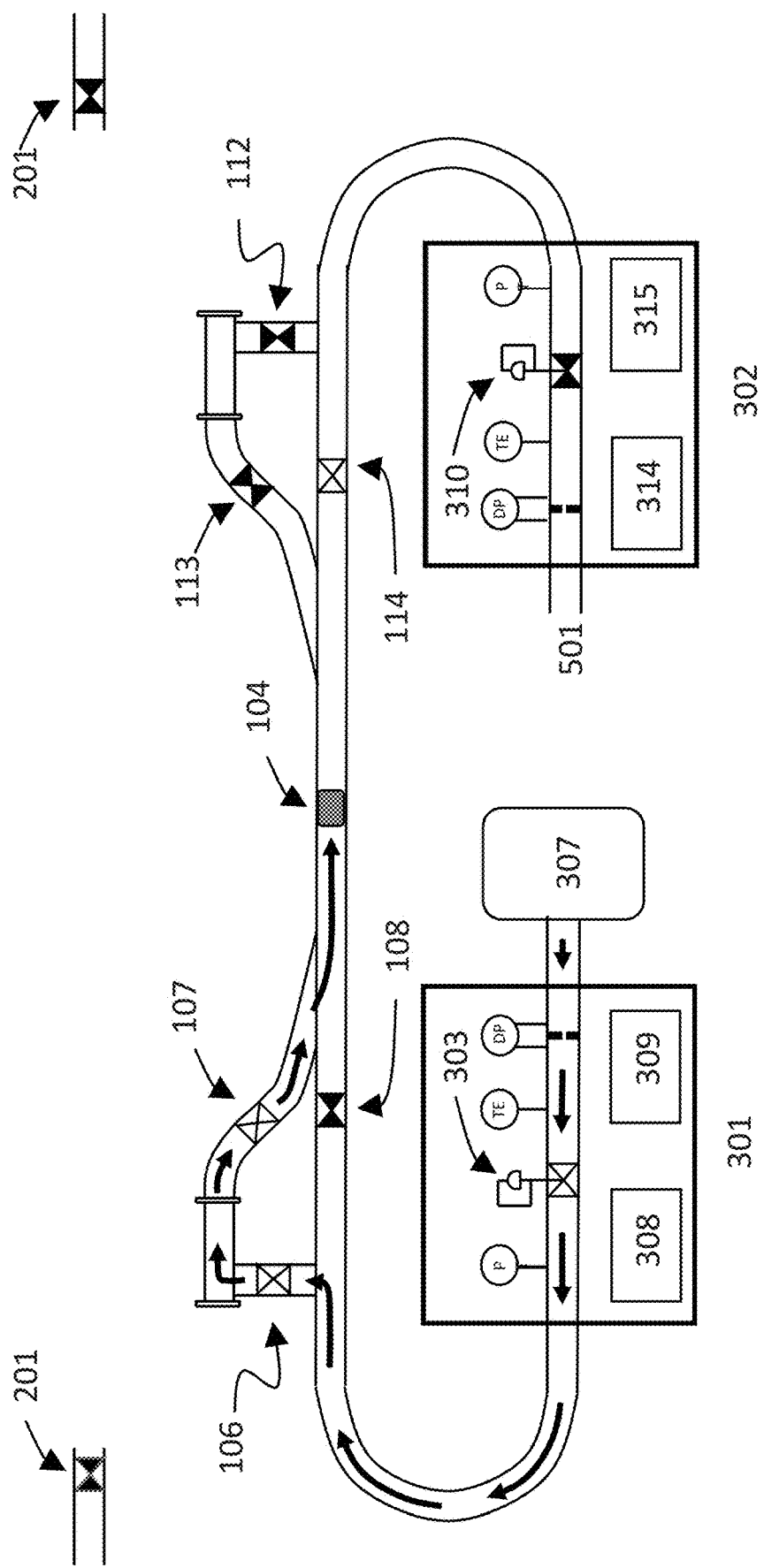
FIG. 6 is a schematic representation of the pig launching step, in accordance with one embodiment of the present invention.
Figure 7:
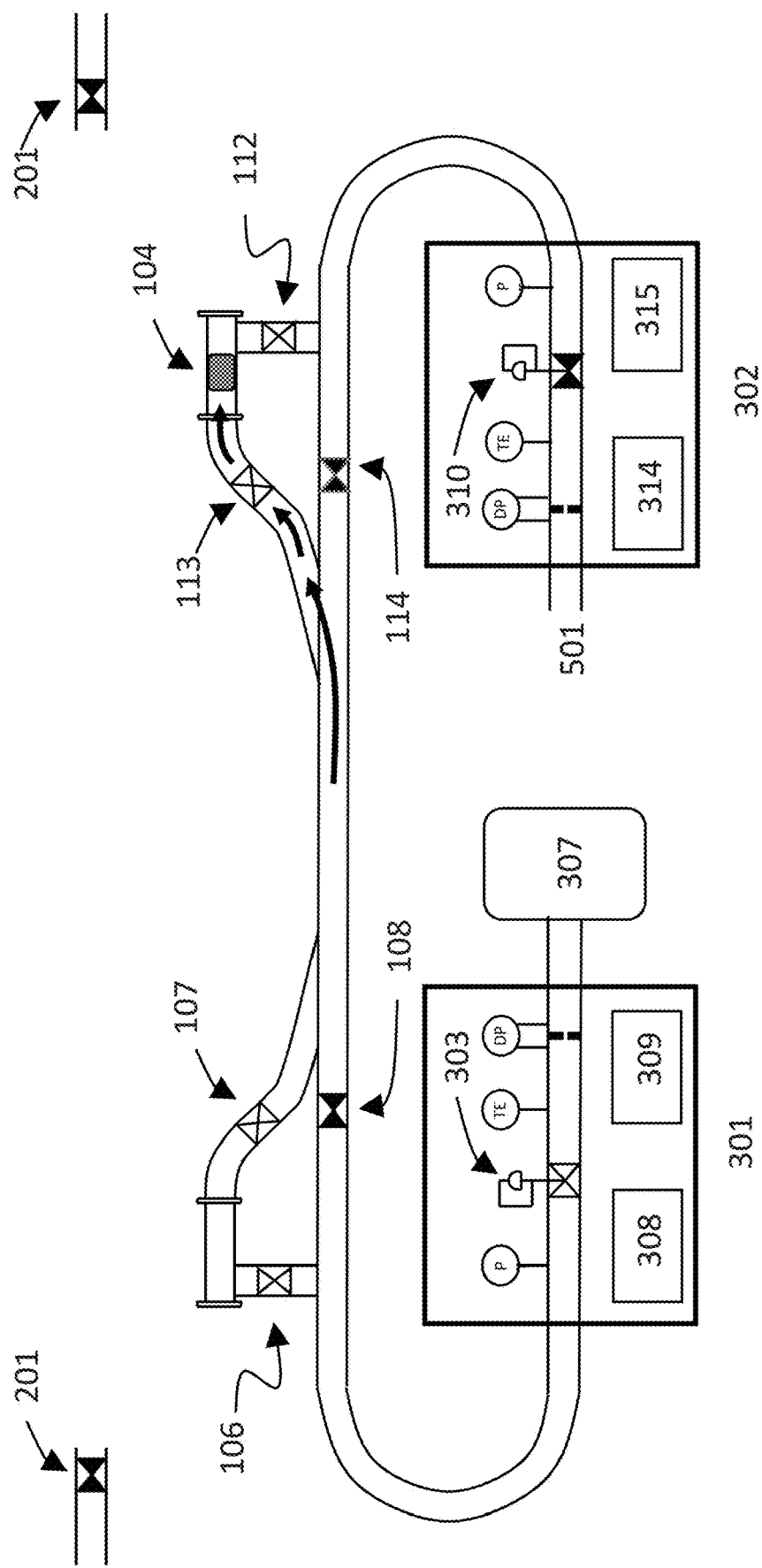
FIG. 7 is a schematic representation of the pig receiving step, in accordance with one embodiment of the present invention.

Pipeline pig 104 is then loaded into pipeline pig launcher 102, for example as described above, or as known in the art. As shown in FIG. 6, at this time, second trap isolation valve 113, bypass valve 112, first main line isolation valve 108, and second control valve 310 are closed, and kicker valve 105, first trap isolation valve 107, first skid flow control valve 303, and second main isolation valve 114 are open.

The first example is for a pressurized pipeline for a smart pig. Still referring to FIG. 6, first flow computer 308 is programmed to allow first flow control valve 303 to provide a predetermined volume of a pressurized gas at a predetermined pressure that has been calculated to drive pipeline pig 104 at a predetermined velocity. Furthermore, first flow computer 308 has a pressure override set at a second, higher excursion pressure to prevent pipeline pig 104 from overspeed conditions and to provide feedback that pipeline pig 104 is actually moving. In this non-limiting example, the predetermined pressure is 500 psig, the excursion pressure is 550 psig, and the predetermined velocity is 2.5 miles per hour.

Should the pressure rise to the excursion pressure, first flow computer 308 will adjust first flow control valve 303 to override the current flow rate command and hold the pressure at this point until the pressure drops or parameters are changed. This safety features prevents pipeline pig 104 from traveling too fast (speed excursions) and it also serves to tell the operator it is moving or stuck. If first flow computer 308 is maintaining the excursion pressure and second flow computer 314 is holding at the predetermined pressure and first flow control valve 303 is closed (i.e. no pressurized gas flow) pipeline pig 104 is stuck and is not moving. At this time, the operator will make manual adjustments as necessary to reestablish pipeline pig 104 velocity.

Second flow computer 314 is operating in pressure control mode, with a setpoint at the predetermined pressure, and the second flow computer 314 opens second flow control valve 310 and vents excess gas through pressurized gas vent 501 as pipeline pig 104 traverses pipeline section to be pigged 202. This constant backpressure also helps to limit speed excursions. Pipeline pig 104 travels the length of pipeline section to be pigged 202 and is recovered in second trap barrel 111.

The second example is for a non-pressurized pipeline for a pipeline pig in a chemical run (or other applications). In this case, as the pipeline pig is loaded, it also carries with it cleaning chemicals. Still referring to FIG. 6, first flow computer 308 is programmed to allow first flow control valve 303 to provide a predetermined volume of a pressurized gas at a predetermined pressure that has been calculated to drive pipeline pig 104 at a predetermined velocity. Furthermore, first flow computer 308 has a pressure override set at a second, higher excursion pressure to prevent pipeline pig 104 from overspeed conditions and to provide feedback that pipeline pig 104 is actually moving. In this operating scenario, second control valve 310 is completely open. In this non-limiting example, the predetermined pressure is 15 psi, the excursion pressure is 65 prig, and the predetermined velocity is 0.65 miles per hour.

Should the pressure rise to the excursion pressure, first flow computer 308 will adjust first flow control valve 303 to override the current flow rate command and hold the pressure at this point until the pressure drops or parameters are changed. This safety features prevents pipeline pig 104 from traveling too fast (speed excursions) and it also serves to tell the operator it is moving or stuck. If first flow computer 308 is maintaining the excursion pressure and second flow computer 314 is holding at the predetermined pressure and first flow control valve 303 is closed (i.e. no pressurized gas flow) pipeline pig 104 is stuck and is not moving. At this time, the operator will make manual adjustments as necessary to reestablish pipeline pig 104 velocity.

Second flow computer 314 is operating in manual control mode, with the valve wide open. The operator may elect to set second flow computer 314 into flow control mode and create a back pressure if desired. This will depend on the field conditions. Pipeline pig 104 travels the length of pipeline section to be pigged 202 and is recovered in second trap barrel 111.

It will be understood that many additional changes in the details, materials, steps and arrangement of parts, which have been herein described in order to explain the nature of the invention, may be made by those skilled in the art within the principle and scope of the invention as expressed in the appended claims, Thus, the present invention is not intended to be limited to the specific embodiments in the examples given above.

What is claimed is:

1. A method for controlling the velocity of a pipeline pig, the method comprising, maintaining the velocity of a smart pipeline pig at a predetermined velocity by regulating a pressurized gas to a predetermined volume, further comprising:
fluidically connecting a first skid to a first end of a section of pipeline to be treated, and
fluidically connecting a second skid to a second end of the section of pipe to be treated,
the first skid comprising a first temperature sensor, a first pressure sensor, a first differential pressure sensor, a first flow control valve, and a first flow computer, and the second skid comprising a second temperature sensor, a second pressure sensor, a second differential pressure sensor, a second flow control valve, and a second flow computer.

2. The method of claim 1, wherein predetermined volume flowrate is calculated by the first flow computer by utilizing data provided by the first temperature sensor, the first pressure sensor, and the first differential pressure sensor.

3. The method of claim 1, wherein the velocity of the smart pipeline pig is monitored by the first flow computer and adjusted by the first control valve.

4. The method of claim 1, wherein if an excursion pressure at the first pressure sensor exceeds a predetermined excursion pressure, the first flow computer will override the first flow control valve and maintain the excursion pressure.

5. The method of claim 4, wherein if a pressure at the second pressure sensor remains constant while the excursion pressure is maintained, a signal is generated to indicate that the smart pipeline pig is stuck and not moving.

6. The method of claim 1, wherein the pressurized gas is compressed nitrogen.

7. The method of claim 1, wherein the pressurized gas is compressed air.

8. A method for controlling the velocity of a pipeline pig, the method comprising, introducing a pressurized gas into a section of pipeline to be treated and maintaining the velocity of a smart pipeline pig at a predetermined velocity by regulating the pressurized gas to a predetermined volume,
wherein the first skid comprises a first temperature sensor, a first pressure sensor, a first differential pressure sensor, a first flow control valve, and a first flow computer, and the second skid comprises a second temperature sensor, a second pressure sensor, a second differential pressure sensor, a second flow control valve, and a second flow computer.

9. The method of claim 8, wherein predetermined volume flowrate is calculated by the first flow computer by utilizing data provided by the first temperature sensor, the first pressure sensor, and the first differential pressure sensor.

10. The method of claim 8, wherein the velocity of the smart pipeline pig is monitored by the first flow computer and adjusted by the first control valve.

11. The method of claim 8, wherein if an excursion pressure at the first pressure sensor exceeds a predetermined excursion pressure, the first flow computer will override the first flow control valve and maintain the excursion pressure.

12. The method of claim 11, wherein if a pressure at the second pressure sensor remains constant while the excursion pressure is maintained, a signal is generated to indicate that the smart pipeline pig is stuck and not moving.

13. The method of claim 8, wherein the pressurized gas is compressed nitrogen.

14. The method of claim 8, wherein the pressurized gas is compressed air.

15. A method for controlling the velocity of a pipeline pig, the method comprising:

fluidically connecting a first skid to a first end of a section of pipeline to be treated, fluidically connecting a second skid to a second end of the section of pipeline to be treated, introducing a pressurized gas into the section of pipeline to be treated via the first skid, launching a smart pipeline pig into the section of pipeline to be treated, and maintaining the velocity of the smart pipeline pig at a predetermined velocity by regulating the pressurized gas to a predetermined volume, wherein the first skid comprises a first temperature sensor, a first pressure sensor, a first differential pressure sensor, a first flow control valve, and a first flow computer, and the second skid comprises a second temperature sensor, a second pressure sensor, a second differential pressure sensor, a second flow control valve, and a second flow computer.

16. The method of claim 15, wherein the pressurized gas is compressed nitrogen.

17. The method of claim 15, wherein the pressurized gas is compressed air.

\* \* \* \* \*